United States Patent [19]

Ichimura et al.

[11] Patent Number: 5,648,762
[45] Date of Patent: Jul. 15, 1997

[54] BUILT-IN ELECTRONIC APPARATUS AND DEVICE-DETACHING METHOD THEREFOR

[75] Inventors: Akira Ichimura, Kawasaki; Masao Ishizaki, Tokyo, both of Japan

[73] Assignee: Canon Kabushiki Kaisha, Tokyo, Japan

[21] Appl. No.: 382,196

[22] Filed: Feb. 1, 1995

[30] Foreign Application Priority Data

Feb. 4, 1994  [JP]  Japan ................... 6-012699

[51] Int. Cl.⁶ ............................................. H04Q 1/00
[52] U.S. Cl. .............................................. 340/825.31
[58] Field of Search ................... 340/825.31, 825.34; 73/58; 380/4, 23

[56] References Cited

U.S. PATENT DOCUMENTS

| | | | |
|---|---|---|---|
| 5,282,247 | 1/1994 | McLean | 380/4 |
| 5,313,639 | 5/1994 | Chao | 340/825.31 |
| 5,377,269 | 12/1994 | Heptig | 340/825.31 |
| 5,434,562 | 7/1995 | Reardon | 340/825.31 |

FOREIGN PATENT DOCUMENTS

| | | |
|---|---|---|
| 0544528 | 11/1992 | European Pat. Off. . |
| 4-342005 | 11/1992 | Japan . |
| 6-75862 | 3/1994 | Japan . |
| 95/12168 | 5/1995 | WIPO . |

OTHER PUBLICATIONS

IBM Technical Disclosure Bulletin, vol. 38 No. 02, p. 365.
Research Disclosure (Hewlett Packard), vol. 355 document 026, Williams K.

*Primary Examiner*—Brian Zimmerman
*Attorney, Agent, or Firm*—Fitzpatrick, Cella Harper & Scinto

[57] ABSTRACT

A built-in electronic apparatus used where a notebook personal computer is inserted into a docking station main body. If detachment of the notebook PC from the main body is instructed while the notebook PC is attached to the main body, in response to the detachment instruction, password-input is instructed. If the input password coincides with a prestored password, the application program currently executed is terminated, and the docking station main body is separated from the notebook PC at the software stage. Thereafter, key-lock that physically connects the notebook PC and the main body is released. Thus, the notebook PC becomes detachable from the docking station main body.

18 Claims, 10 Drawing Sheets

BUILT-IN ELECTRONIC APPARATUS AND DEVICE-DETACHING METHOD THEREFOR

BACKGROUND OF THE INVENTION

The present invention relates to a built-in electronic apparatus where a notebook personal computer is attached to a desktop device and a method for detaching the personal computer from the desktop device.

[Description of Related Art]

Built-in type computer devices, where, e.g., a notebook personal computer (hereinafter abbreviated into "notebook PC") is attached to a desktop device main body (docking station), and the CPU incorporated in the notebook PC controls the overall desktop device are known. In this state where the notebook PC is attached to the device main body, the components of the device such as a hard disk and a keyboard are operative, and the display unit of the device displays various data. On the other hand, the keyboard and the display of the notebook PC are not operative; however, the other components such as a hard disk and memory can be used.

The problem is that when the notebook PC is forcibly detached from the desktop device while the notebook PC is working in the desktop device main body, the file system currently being executed may be destroyed. Further, as small-sized expensive computers such as a notebook PC can be easily carried, they may be stolen from the desktop device main body while the user is away from the device.

SUMMARY OF THE INVENTION

The present invention has been made in consideration of the above situation, and has as its object to provide a built-in electronic apparatus and device-detaching method for the apparatus, which protect data files or a system from being damaged upon detachment of a first electronic device from a second electronic device. Upon reception of a detachment instruction, the apparatus first releases the connection between hardware and software of the first electronic device and those of the second electronic device, and allows detachment of the first electronic device from the second electronic device.

Another object of the present invention is to provide a built-in electronic apparatus which prevents the detachment of devices by an unauthorized person and a device-detaching method for the apparatus.

Further, another object of the present invention is to provide a built-in apparatus which can detach a first electronic device from a second electronic device by simple operation and a device-detaching method for the apparatus.

Further, another object of the present invention is to provide a built-in apparatus in which various device-detaching methods to detach a first electronic device from the apparatus can be set.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

The preferred embodiment of the present invention will be described in detail in accordance with the accompanying drawings.

Figure 1:
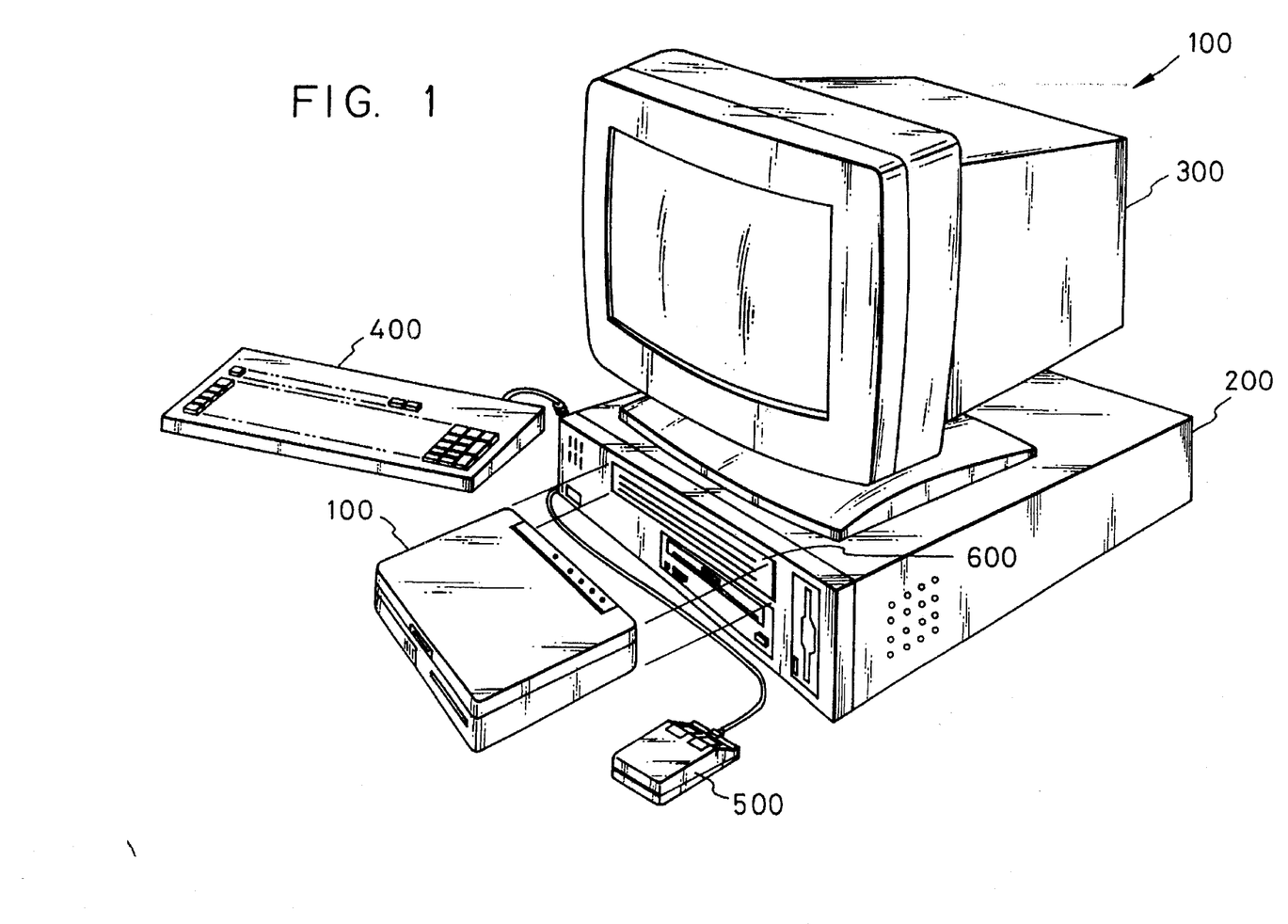
FIG. 1 is a perspective view for explaining the attachment of a notebook personal computer (notebook PC) to a dock (docking station) main body, in an embodiment of the present invention.

FIG. 1 is a perspective view showing a state where a notebook personal computer (notebook PC) 100 is connected to a docking station 1000.

In FIG. 1, the note PC 100 closes its display portion. The docking station 1000 comprises a docking station main body (hereinafter, referred to as "dock main body") 200, a CRT display unit 300 connected to the dock main body 200, a keyboard 400 and a pointing device 500. A dock 600 is provided on the front surface of the dock main body 200, in which the cover of the notebook PC 100 closed as shown in FIG. 1 is inserted. As a result, an interface unit (not shown) on the rear surface of the notebook PC 100 is connected to an internal interface unit (not shown) of the dock main body 200, thus, the docking station 1000 functions as a desktop-type electronic device.

Note that a floppy disk drive and a CD-ROM drive unit are provided on the front surface of the dock main body 200, and an operator can utilize these units. Further, various extension boards are to be inserted from the rear surface of the dock main body 200. The dock main body 200 incorporates a hard disk, an auxiliary memory for the memory capacity of the notebook CPU and the like, the detailed description of these units will be made later.

Figure 2:
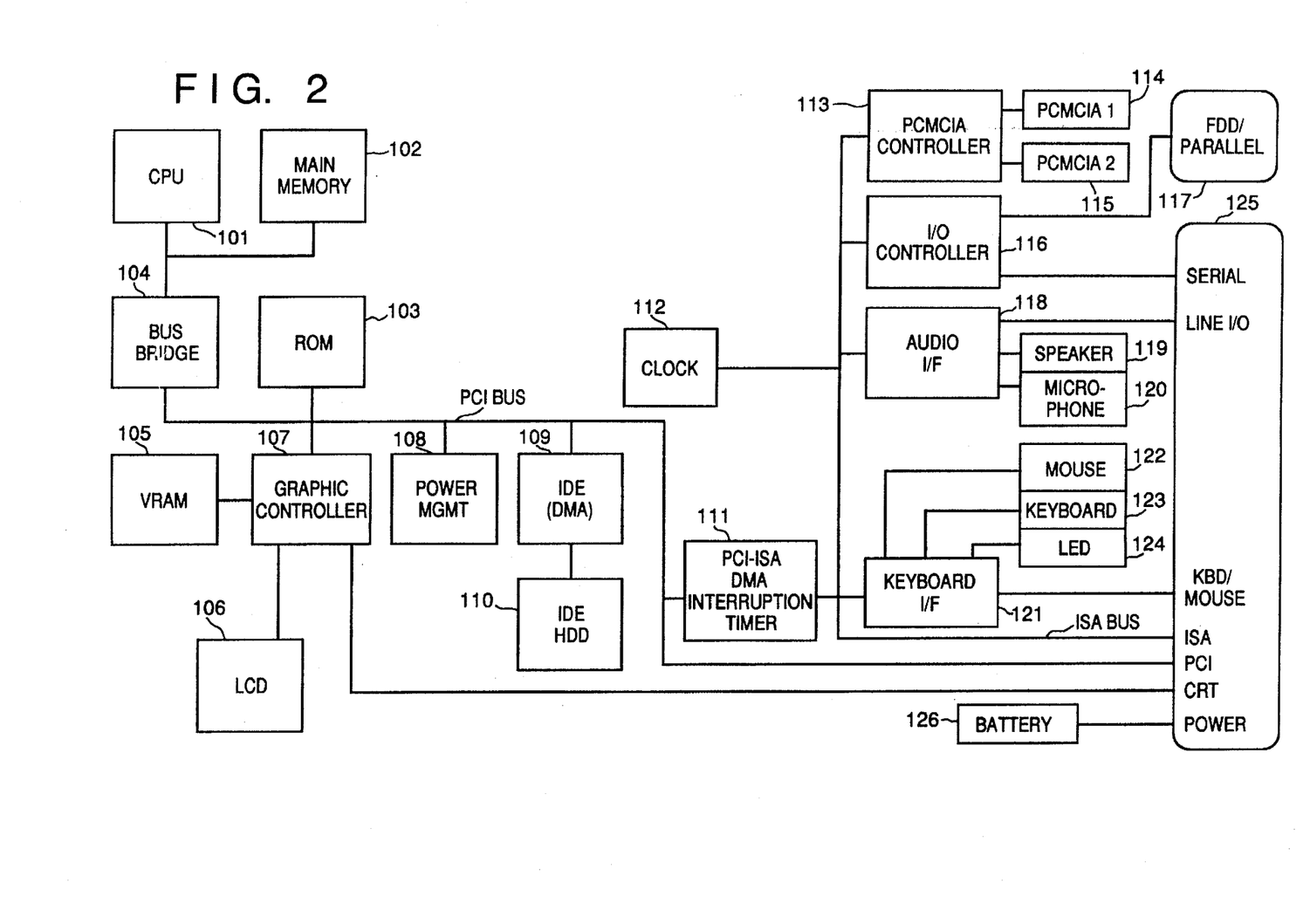
FIG. 2 is a block diagram showing the construction of the notebook PC according to the embodiment.
Figure 3:
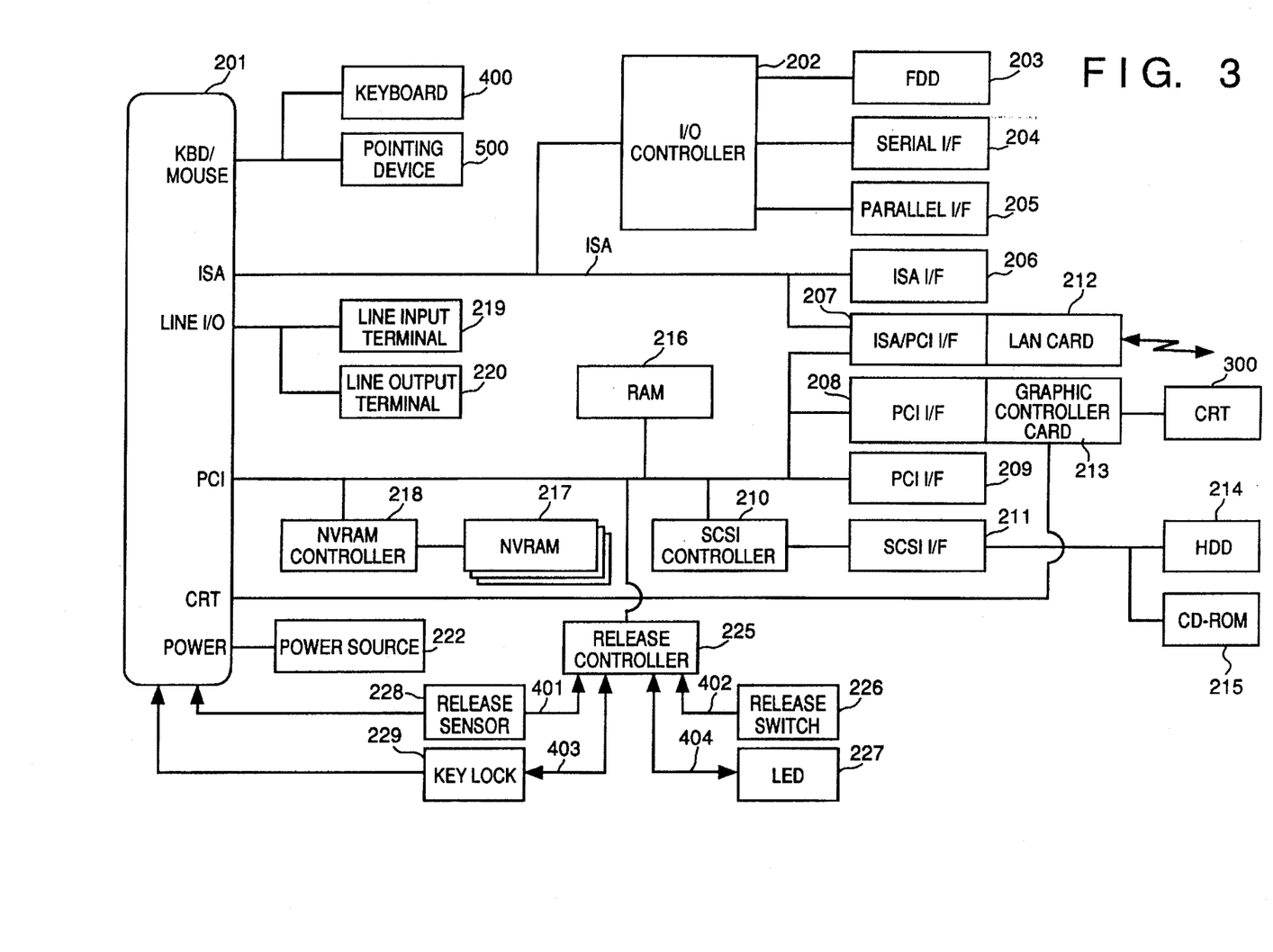
FIG. 3 is a block diagram showing the construction of the docking station according to the embodiment.

FIG. 2 shows the construction of the notebook PC 100, and FIG. 3, the construction of the dock main body 200.

In FIG. 2, reference numeral 101 denotes a CPU which controls the overall notebook PC 100, and controls the dock main body 200 (FIG. 1) when the notebook PC 100 is connected to the dock main body 200; 102, a main memory comprising a ROM and a RAM, in which an OS and various application softwares are loaded and executed by the CPU 101; and 103, a ROM in which ID information of each notebook PC 100 (values different with respect to individual notebook PC), connected to a PCI bus (Peripheral Component Interconnect bus, one of local buses), as shown in FIG.

2. The bus connecting the CPU 101 and the main memory 102 and the PCI bus are connected via a bus bridge 104.

Numeral 105 denotes a video memory (VRAM) for developing display image data; 106, a liquid crystal display (LCD) which displays the image developed in the VRAM 105; and 107, a graphic controller which performs drawing processing to the VRAM 105 and reads display image data out of the VRAM 105 to output the data to the LCD 106 as a video signal. Note that the graphic controller 107 comprises a D/A converter for converting the digital bit image data developed in the VRAM 105 into an analog signal. The graphic controller 107 outputs the analog signal to an extension connector 125. Numeral 108 denotes a power management unit (Power MGMT) which manages the power supply of a battery 126 (rechargeable), and when the capacity of the power supply is low, notifies the CPU 101 of the low power supply state. Further, the power MGMT controls the power supply to the respective devices so as to save electronic consumption. Numeral 109 denotes an IDE (Intelligent Drive Electronics) controller which controls writing/reading to/from an IDE-based hard disk 110.

Further, the PCI bus is connected to a bus controller 111 for controlling data transfer on the PCI bus and that on an ISA (Industry Standard Architecture) bus. The bus controller 111 performs, in addition to the above control on data transfer on the PCI bus and the ISA bus, DMA function control, interruption control (e.g., informing the CPU 101 of input from the keyboard) and timer control. The timer is used, e.g., when an interruption signal is periodically generated.

Next, the ISA bus is connected to a clock 112, including a real-time clock and a non-volatile RAM, and a PCMCIA controller 113 which, if various IC cards are attached, performs data transfer between the IC cards. Numerals 114 and 115 denote the IC cards. Numeral 116 denotes an I/O controller connected to a connector 117, for a floppy disk drive additionally incorporated into the notebook PC 100 or a parallel I/F, and the extension connector 125 (to be connected to a serial interface in the dock main body 200). Numeral 118 denotes an audio interface for audio-data transfer between a speaker 119 in (or the outside of) the notebook PC 100 and a microphone 120; 121, a keyboard interface for controlling a keyboard 123, a mouse 122 and LED lamps of the respective devices. As described later, when the notebook PC 100 is connected to the dock main body 200, the cover of the notebook PC 100 is closed, and the keyboard 123 of the notebook PC 100 becomes inoperative. For this reason, the keyboard interface 121 is also connected to the extension connector 125 connected to the dock main body 200.

The battery 126 supplies electric power to the notebook PC 100. When the notebook PC 100 is connected to the dock main body 200, the battery 126 is recharged by the dock main body 200 side via the extension connector 125. At this time, the above respective units operate using the electric power mainly from the dock main body 200.

As it is easily understood from the above description, the extension connector 125 is provided on the rear surface of the notebook PC 100 for connecting the interface in the dock main body 200 and enabling the accessing from the notebook PC 100 to the respective devices provided on the bus of the dock main body 200.

Next, the construction of the dock main body 200 will be described with reference to FIG. 3.

In FIG. 3, numeral 201 denotes a connector for the electrical connection with the extension connector 125 of the notebook PC 100. The connector 201 has a signal line KBD/MOUSE connected to a keyboard 400 and a mouse 500 (see FIG. 1), that is, connected to the keyboard interface 121 of the notebook PC 100. Numeral 202 denotes an I/O controller connected to the ISA bus of the notebook PC 100, to which a floppy disk drive (FDD) 203 of the dock main body 200 is connected. This connection enables writing/reading of data into/from the FDD 203 after connecting the notebook PC 100 to the dock main body 200. Further, the I/O controller 202 is connected to a serial I/F 204 and a parallel I/F 205 (the connectors of these I/F's are provided on the rear surface of the dock main body 200), for connection with various devices (e.g., a modem).

Numerals 206 to 209 denote interfaces (connectors), provided within an extension slot on the rear surface of the dock main body 200, for connecting the ISA bus or the PCI bus with extension boards or extension cards which are attachable to the dock main body. Note that the ISA interface 206 is used for the ISA bus; the interface 207, for the ISA bus and the PCI bus; and the interfaces 208 and 209, for the PCI bus. As the interface 207 is for the both buses, up to two boards and cards for the ISA are attachable, and up to three boards and cards for the PCI bus are attachable, though the number of the interfaces is four.

FIG. 3 shows a LAN card 212 attached to the ISA/PCI interface 207, and a graphic controller card 213 attached to the PCI interface 208. It is well known that the LAN card 212 is an extension card (board) for constructing a local area network, and that the graphic controller card 213 has a VRAM of several megabyte and a chip for high-speed bit-mapping or high-speed image data transfer. To display an image (a low resolution image) in the VRAM 105 of the notebook PC 100, the graphic controller card 213 outputs the input video signal (CRT signal) to the CRT 300 without performing any process on the signal (as it is). In this case, the CPU 101 issues various drawing instructions to the graphic controller 107 of the notebook PC 100, and develops the display image in the VRAM 105.

On the other hand, to perform high-resolution and high speed display utilizing the function of the graphic controller card 213, the CPU 101 issues the various drawing instructions to the graphic controller card 213. At this time, the graphic controller card 213 ignores the CRT signal provided from the notebook PC 100, and outputs the image data stored in the VRAM of the graphic controller 213 as a video signal to the CRT 300.

Now returning to FIG. 3, numeral 214 denotes a hard disk drive (HDD) connected to an SCSI (Small Computer System Interface) 211; and 215, a CD-ROM drive. These storage devices are accessible by the CPU 101 when the notebook PC 100 is connected to the dock main body 200. Numeral 216 denotes an auxiliary RAM for the main memory 102 of the notebook PC 100, for increasing the memory capacity when the notebook PC 100 is connected, to enable the execution of large-scaled programs or processing large amount of data. Note that the RAM 216 is an SIMM (Single In-line Memory Module) type memory, the memory capacity of which can be increased depending on necessity. Numeral 217 denotes a non-volatile memory (NVRAM); 218, an NVRAM controller which controls writing/reading to/from the NVRAM 217. ID (unique to each docking station) of the dock main body 200, a password, the ID of a connectable notebook PC and available device information of the notebook PC, device table information etc. are stored in the NVRAM 217. Numeral 219 denotes a line input terminal, and 220, a line output terminal, both connected to the audio interface 118 of the notebook PC 100. These terminals are connectable to an external speaker, an external microphone and the like. Numeral 222 denotes a power source which receives AC commercial electric power from an AC plug (not shown), converts the electric power into a DC power of a predetermined voltage and supplies the DC power to the dock main body 200. When the notebook PC 100 is connected to the dock main body 200, the power source 222 charges the battery 126 of the notebook PC 100 and supplies electric power to the notebook PC 100.

Numeral 225 denotes a release controller which is a characteristic portion of the embodiment. As described later with reference to FIG. 5, the release controller 225 controls the detachment (release) of the notebook PC 100 from the dock main body 200. Numeral 226 denotes a release switch used by a user to instruct the detachment of the notebook PC 100 from the dock main body 200; 227, an LED which goes on and off when the notebook PC 100 is detachable from the dock main body 200; 228, a release sensor which detects the application of pulling force to the notebook PC 100 so as to pull out the notebook PC 100 from dock main body 200; 229, a key lock which physically locks the notebook PC 100 to the dock main body 200. The key lock 229 locks/unlocks in accordance with a signal from the release controller 225. Note that signals 401 to 404 will be described later with reference to FIG. 5.

Generally, notebook PC's may have resume function. The detailed explanation of this function is omitted, since the resume function is well known. When a display of the notebook PC is closed or a predetermined switch is operated, the resume function is activated to stop electric power supply to the display and to stop clock signal supply to the CPU, to save electric power consumption, and when the display is opened or a predetermined switch is operated, the resume function is activated to restore the status immediately before the power supply and the clock signal supply was stopped, to continue the previous processing. In this embodiment, as the display unit of the notebook PC 100 is closed, the electric power supply is stopped as power-supply saving means. Hereinafter, this status is referred to as "suspended status" and the restoration of the operation of the apparatus, as "resume" operation.

Next, the connection between the notebook PC 100 and the dock main body 200 respectively having the above constructions will be described below.

First, the notebook PC 100 which independently operates is closed and turned into the suspended status (as the notebook PC 100 shown in FIG. 1). Then, the notebook PC 100 in the suspended status is inserted into the dock main body 200 through the dock 600, and electrically connected to the dock main body 200 (as shown in FIG. 1). The notebook PC 100 has a switch 440 (FIG. 4) on the rear panel of the notebook PC 100, for detecting the connection between the notebook PC 100 and the dock main body 200 (note that this switch 440 may be a physical switch or may be a switch for detection based on an electric signal level). When the switch 440 is activated, the notebook PC 100 is resumed though it is closed.

Figure 4:
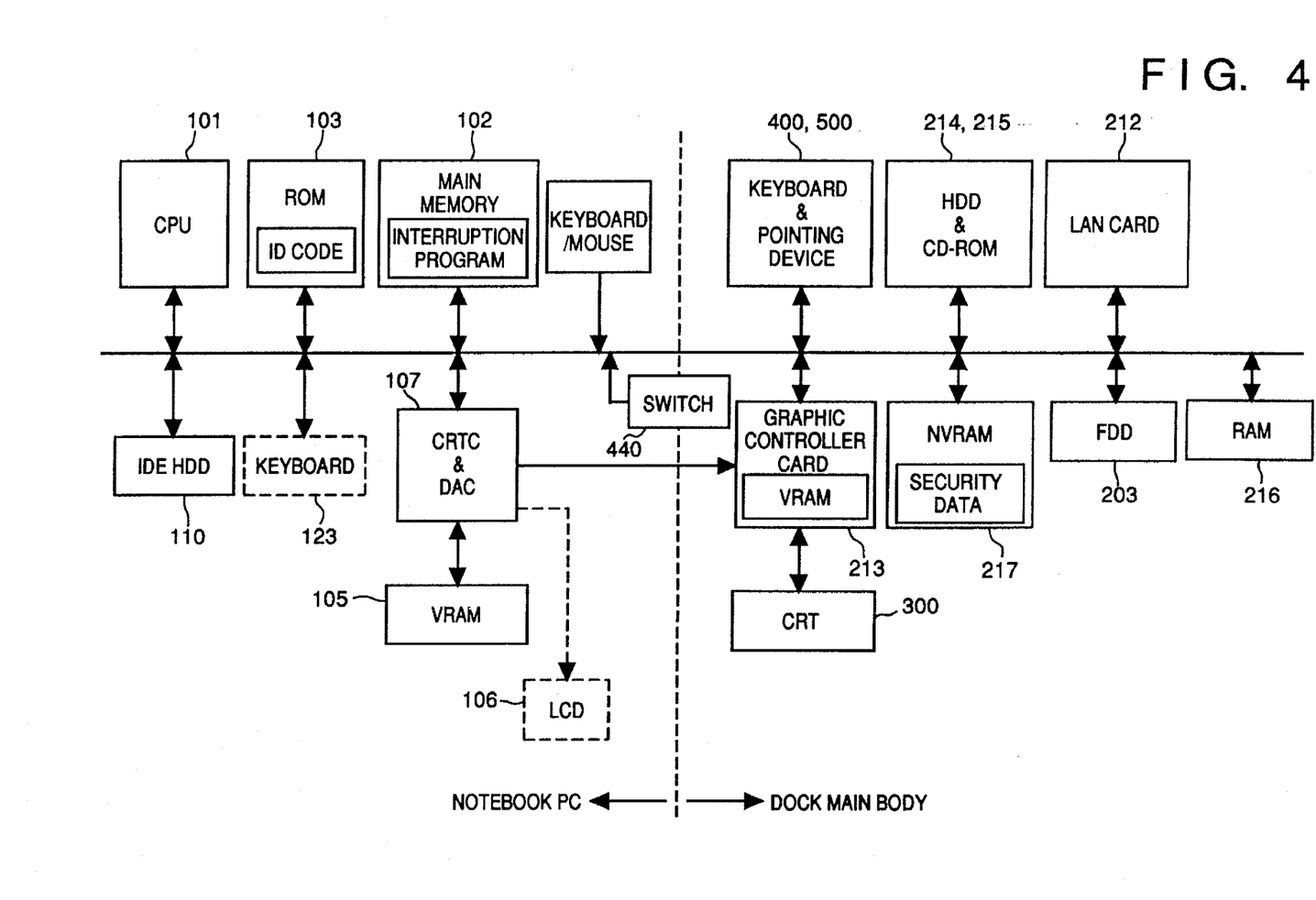
FIG. 4 is a block diagram showing the status where the notebook PC and the docking station of the embodiment are connected.

As the notebook PC 100 is also resumed when the cover is opened, the CPU 101 determines whether the notebook PC 100 has been resumed by connection to the dock main body 200 or by opening the cover. At the initial stage of resuming operation, the CPU 101 makes a determination based on the logic level of a signal line outputted from the switch 440. If the CPU 101 determines that the notebook PC 100 has been resumed by connection to the dock main body 200, the CPU 101 reconstructs the system environment and completes the resuming operation.

In a case where the notebook PC 100 is connected to the dock main body 200 (i.e., when the notebook PC 100 is inserted into the dock 600 to be integrated with the dock main body 200), the schematic construction of the system is as shown in FIG. 4. Note that FIG. 4 only shows the significant components for the purpose of simplification. Further, the broken-lined portions (the keyboard 123 and the LCD 106) on the notebook PC 100 are not operative.

Figure 5:
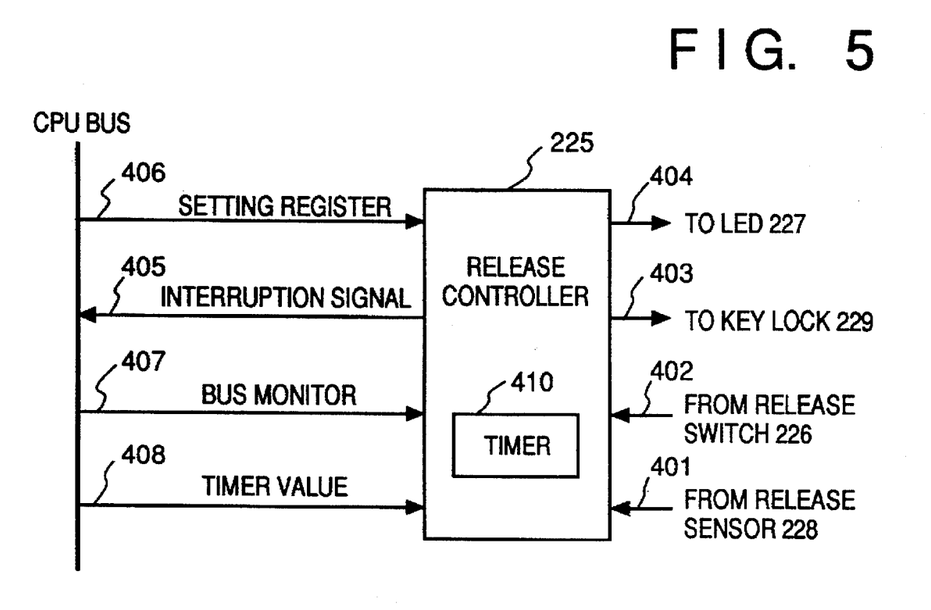
FIG. 5 is a block diagram showing input/output signals of a release controller of the embodiment.

FIG. 5 is a block diagram showing input/output signals of the release controller 225 of the embodiment. The release controller 225 may comprise, a CPU, a ROM and the like, otherwise, may comprise a customized LSI having logic circuits.

The release controller 225 inputs a signal 402 from the release switch 226, for instructing the detachment of the notebook PC 100 and a signal 401 from the release sensor 228, indicative of the application of pulling force to the notebook PC 100. If any of these signals is inputted, the release controller 225 outputs an interruption signal 405 to the CPU 101 via the PCI bus. A signal 403 is used for causing the key lock 229 to lock/unlock the notebook PC 100 to/from the dock main body 200, and a signal 404 is used for setting a value to a register of the release controller 225. The signal 404 is inputted under the control of the CPU 101.

Next, modes set into the register of the release controller 225 are as follows:

(1) Starting of lock release mode by the release controller 225. This turns the release controller 225 into lock release mode (2) Turning on/off of key-lock free mode: when the key-lock free mode is set, if the CPU 101 does not operate, the notebook PC 100 can be detached from the dock main body 200 at any time (3) Setting of lock release mode, as
   ① timer release mode . . . to release the lock (connection between the PC 100 and the main body 200) after the elapse of a predetermined period
   ② bus monitor mode . . . to release the lock after the bus operation has stopped (4) Setting of timer value (the predetermined time period) in the timer release mode The above operation modes can be set into the register of the release controller 225 by the CPU 101. The operation of setting these modes will be described in detail with reference to the flowchart of FIG. 9. A signal 407 is used for monitoring the bus operation when the bus monitor mode is set. A signal 408 is used for setting a time value at the timer 410 in the release controller 225 under the control of the CPU 101. The timing of releasing the key lock (the timer release mode) is determined in accordance with the set timer value. Note that the operation of the release controller 225 in the bus monitor mode and the time release mode will be described in detail with reference to the flowchart of FIG. 8.

Figure 6:
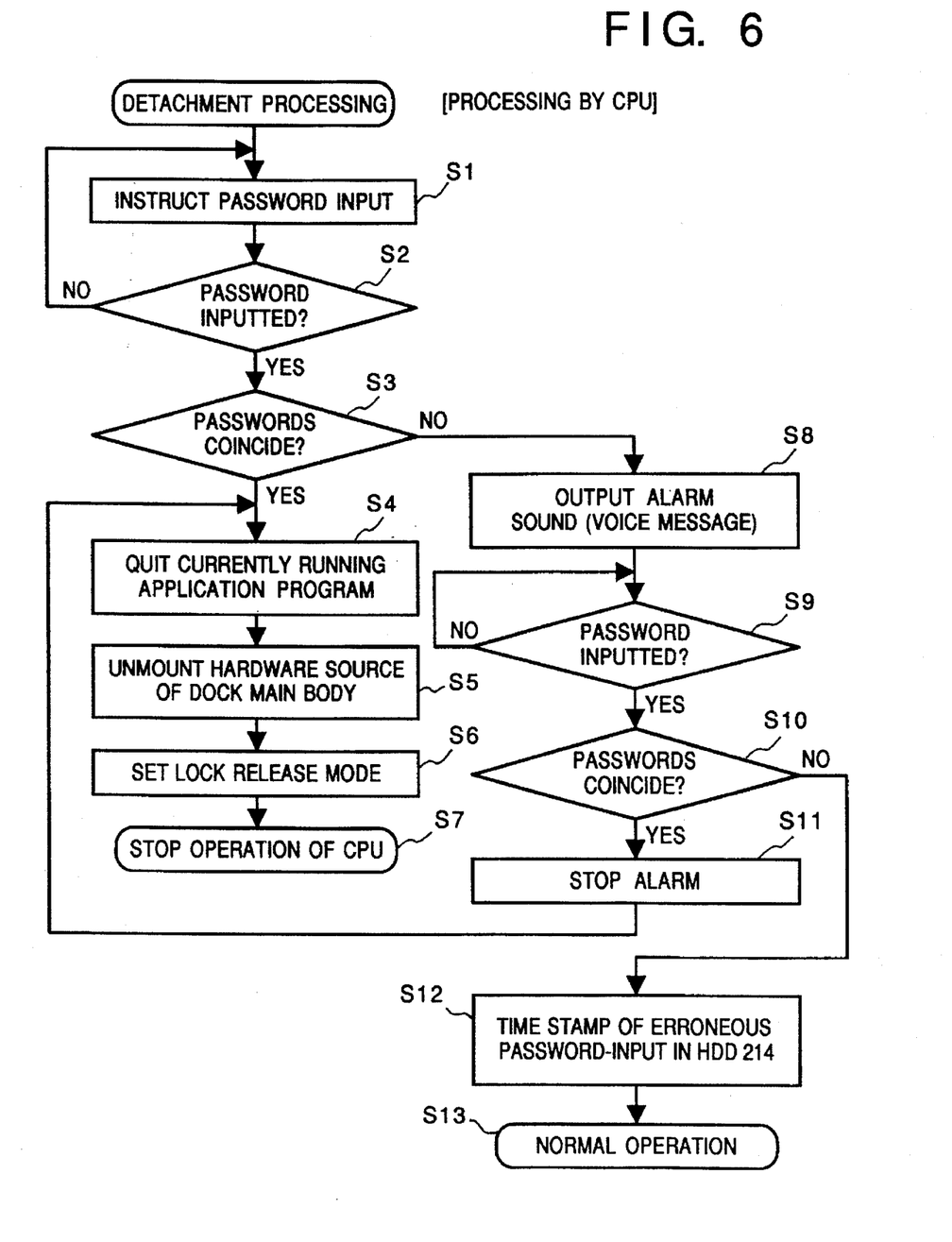
FIG. 6 is a flowchart showing detachment processing performed by a CPU of the notebook PC of the embodiment.

FIG. 6 is a flowchart showing the detachment processing for the notebook PC 100 by the CPU 101 when a detachment mode is started while the CPU 101 is operating. The control program for executing this processing is stored in the main memory 102.

The detachment processing starts when the operator designates an icon of the notebook PC displayed on the CRT display unit 300 with the pointing device 500 such as a mouse, and moves the icon into a trash displayed on the CRT screen. Otherwise, the processing starts under the control of the CPU 101 when the operator inputs a command the like instructing detachment of the notebook PC 100 using the keyboard 400. Further, the processing starts when the release controller 225 detects pressing of the release switch 226 or the application of a pulling force to the notebook PC 100 and generates an interruption signal to the CPU 101.

Figure 8:
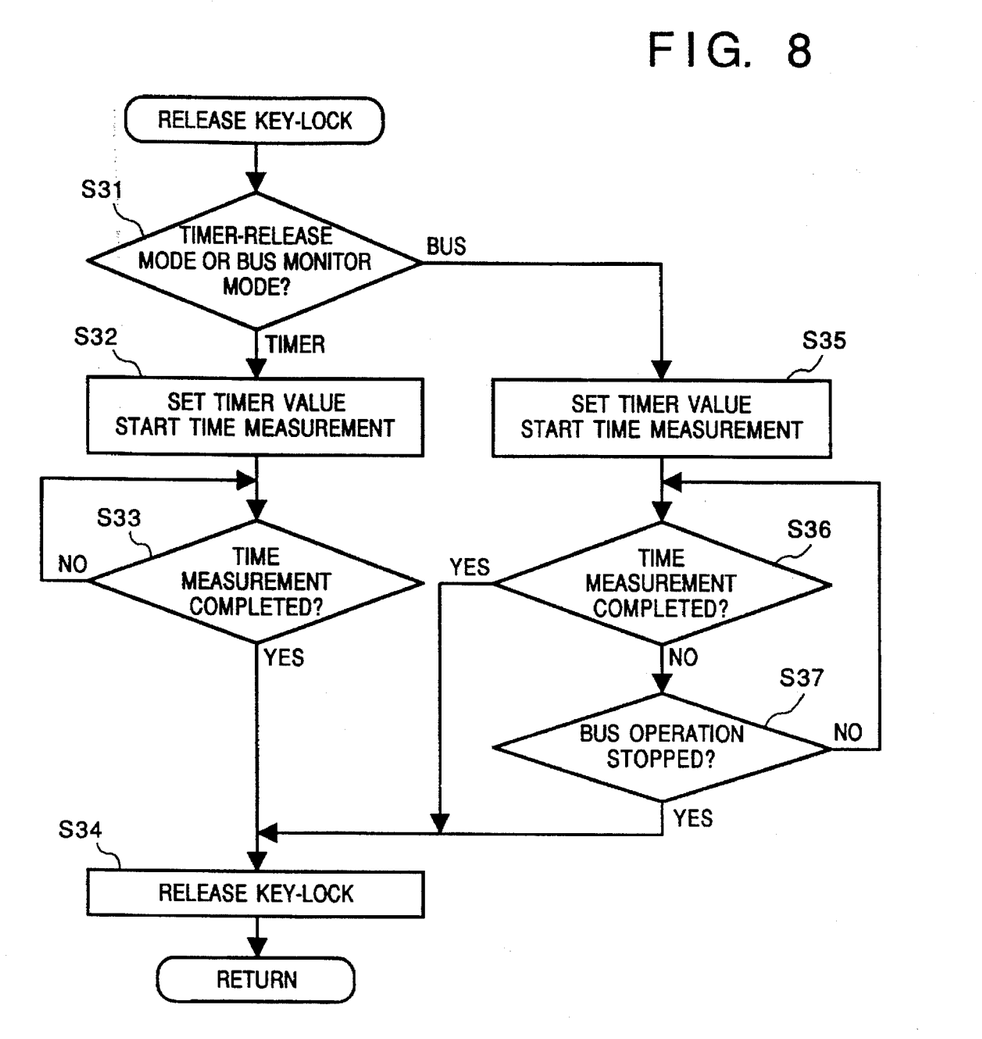
FIG. 8 is a flowchart showing key-lock release processing in step S27 in FIG. 7.

In the detachment mode, in step S1, a message instructing the operator to input a password is displayed on the CRT 300, and the input of password in voice/character/numerals via the keyboard 400 or the line input terminal 219 is awaited. As the password has been inputted, the process proceeds to step S3 in which whether or not the input password coincides with the password stored in the NVRAM 217 or the ROM 103 is determined. If YES, the process proceeds to step S4 in which, if there is application program currently running, the application program is terminated. In step S5, the hardware resource of the dock main body 200 is unmounted from the notebook PC 100 (separation at the software stage). In step S6, the lock release mode is set at the register of the release controller 225, and in step S7, the operation of the CPU 101 is stopped. Thereafter, as shown in the flowchart of FIG. 8, the release controller 225 operates to release the lock. The flowchart of FIG. 8 will be described later.

On the other hand, if NO in step S3, the process proceeds to step S8 in which an alarm is generated in voice or sound. Then in steps S9 and S10, similar to steps S2 and S3, whether or not a password has been inputted is determined. If the input password coincides with the stored password, then the process proceeds to step S11 in which the alarm sound or alarm message generated in step S8 is stopped, then proceeds to step S4. If the input password does not coincide with the stored password in step S10, the process proceeds to step S12 in which a time stamp indicative of input of erroneous password is recorded in the HDD 214, and the alarm sound or alarm message is stopped, then the process advances to normal operation without performing the detachment operation. Thus, information on input of erroneous password is stored in the dock main body 200 by storing the time stamp into the HDD 214. Even if the notebook PC 100 should be forcibly detached and be stolen, since the information (information of the robbery or the aforementioned erroneous password-input) is stored in the HDD 214, the robbery of the notebook PC should be prevented and antitheft effect is improved.

The process shown in the flowchart of FIG. 6 has been described in a case where the power of the apparatus is on and the CPU 101 is operating. However, when the power of the dock main body 200 is off and the CPU 101 is in the suspended status, if the pressing of the release switch 226 is detected or the sensor 228 detects the application of pulling force to the notebook PC 100, the release controller 225 is activated. If the current operation mode is not the key-lock free mode, the release controller 225 generates an interruption signal to the CPU 101. Then, the CPU 101 is activated from the suspended status and turns on the power source 222 to start the detachment processing shown in the flowchart of FIG. 6. The detachment processing in this case is identical to that in FIG. 6, therefore the explanation of the processing will be omitted.

Figure 7:
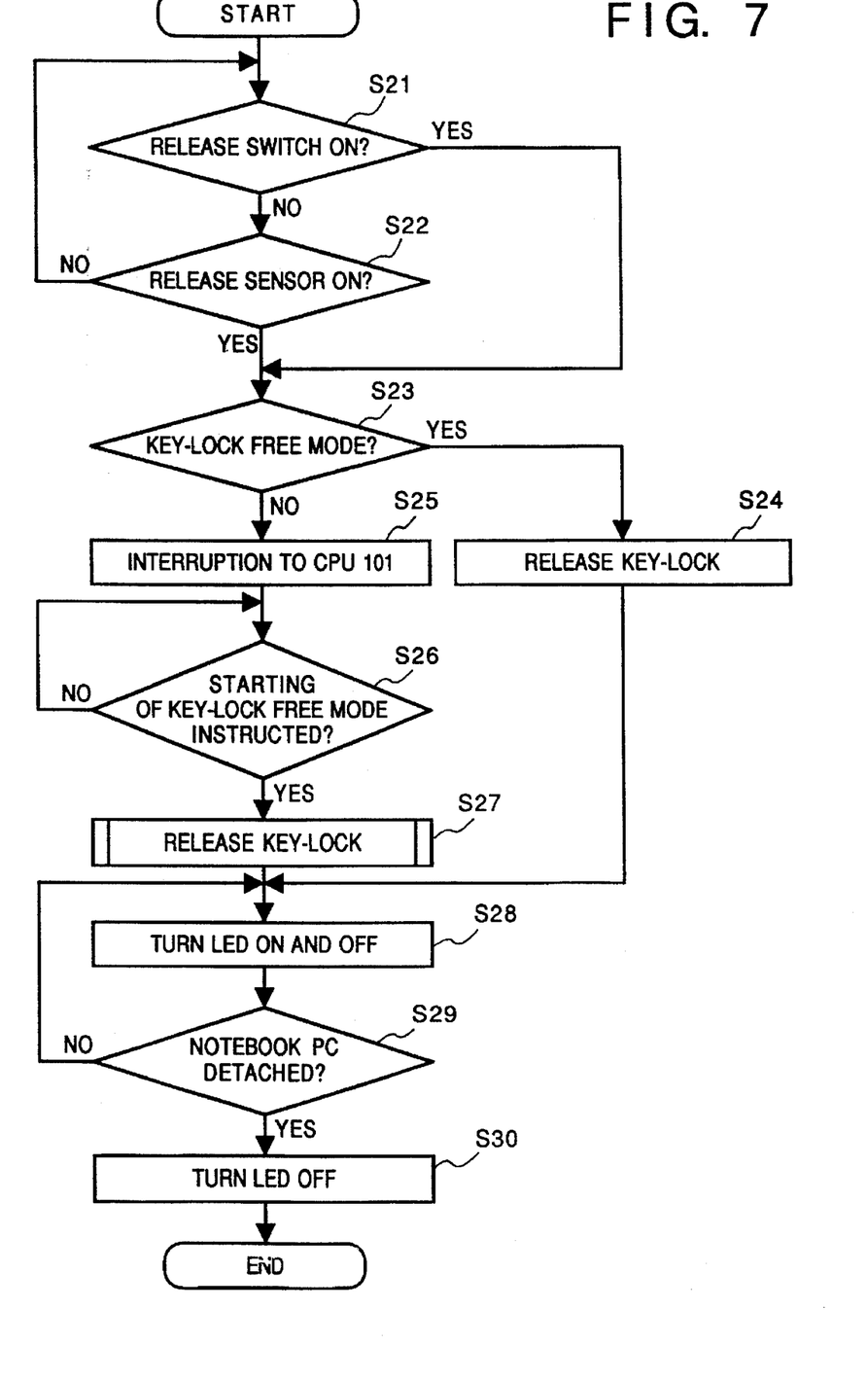
FIG. 7 is a flowchart showing detachment start processing under the control of the release controller.

FIG. 7 is a flowchart showing the processing executed by the release controller 225 of the embodiment. This processing is executed regardless of the operating/non-operating (when the power source 222 is turned off) of the CPU 101.

In step S21, if it is detected that the release switch 226 has been turned on, or in step S22, the release sensor 228 detects that the pulling force has been applied to the notebook PC 100, the process proceeds to step S23, in which it is determined whether or not the key-lock release mode (that unconditionally enables the detachment of the notebook PC 100) has been set by the CPU 100 in advance. If NO, the process proceeds to step S25, in which the interruption signal 405 is supplied with the CPU 101. Then the CPU 101 is activated and, if the power source 222 is off, the power source 222 is turned on, then the processing shown in the flowchart of FIG. 6 is performed.

Thus, the CPU 101 performs the processing of FIG. 6, and outputs a command to start the key-lock release mode to the release controller 225 in step S6.

In step S26, whether or not the command instructing to start the key-lock release mode (setting at the setting register) has been outputted in step S6 of FIG. 6 is determined. If the command is supplied from the CPU 101, the process proceeds to step S27, in which the key-lock release mode starts. The processing by the release controller 225 in the key-lock release mode will be described in detail with reference to the flowchart of FIG. 8. When the lock status by the key lock 229 is released and the notebook PC 100 can be detached, the process proceeds to step S28, in which the LED 227 is turned on and off to inform the user of the detachable status of the notebook PC 100. Then, as the notebook PC 100 has been pulled out of the dock main body 200 in step S29, the LED 227 is turned off (step S30), and the process ends.

Note that if the key-lock free mode has been set in step S23, the process proceeds to step S24, in which the lock status by the key lock 229 is unconditionally released, and the process proceeds to step S28, to perform the above processing.

FIG. 8 is a flowchart showing the key-lock release processing by the release controller 225 performed in step S27 of FIG. 7.

In step S31, whether the timer release mode or the bus monitor mode is set at the register of the release controller 225 is determined. If the timer monitor mode is set, the process proceeds to step S32, in which a timer value pre-set at the register by the CPU 101 is set at the timer 410, and time-measurement by the timer 410 is started. Then, the process proceeds to step S33, in which whether or not the time-measurement by the timer 410 has been completed is determined. If YES, i.e., the status of the timer 410 becomes "time out", the process proceeds to step S34, in which the lock by the key lock 229 is released, and the notebook PC 100 is made detachable.

Note that if the bus monitor mode is set in step S31, the process proceeds to step S35, in which a predetermined timer value set at the register of the release controller 225 is set at the timer 410 to start time measurement. Then, if the time-out status of the timer 410 is detected in step S36 or a stop of the operation of the bus is detected from the bus monitor signal 407 in step S37, the process proceeds to step S34, in which the lock by the key lock 229 is released, and the notebook PC 100 is made detachable.

Figure 9:
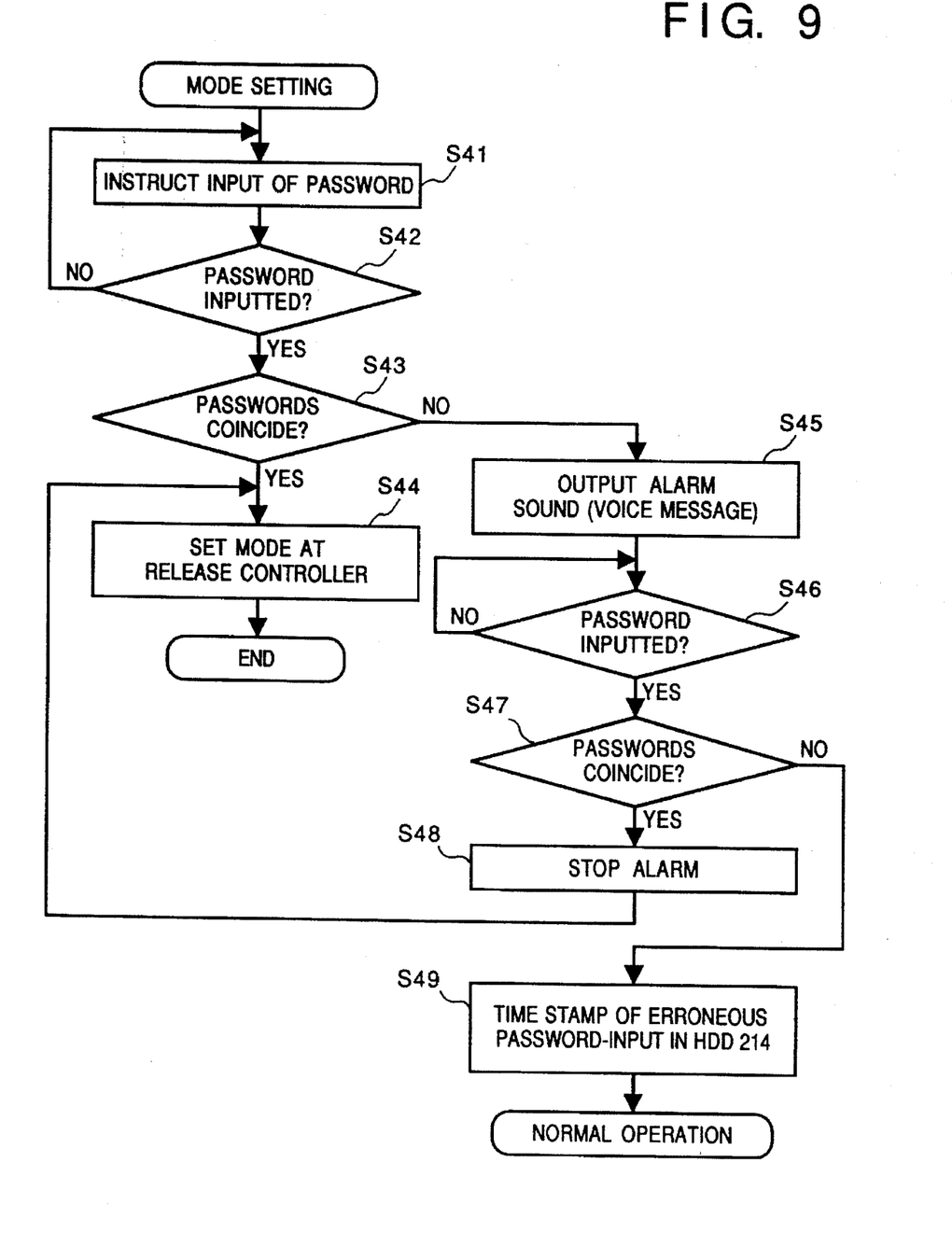
FIG. 9 is a flowchart showing mode setting processing of the release controller under the control of the CPU.

FIG. 9 is a flowchart showing mode setting processing by the CPU 101 to set a mode at the register of the release controller 225. The control program for executing this processing is stored in the main memory 102.

The mode setting processing at the release controller 225 is started by, e.g., designating a menu icon displayed on the CRT device unit 300 using the pointing device 500, or inputting a mode setting command from the keyboard 400. When the mode setting processing is started, the process proceeds to step S41, in which a message instructing input of password is displayed on the CRT display unit 300. Next, in step S42, the password-input is awaited, similar to step S2 of FIG. 6. Then, similar to step S3 of FIG. 6, whether or not the passwords coincide is determined in step S43. If the input password coincides with a prestored password, the process proceeds to step S44, in which the setting of the mode of the release controller 225 is made. At this time, the modes which can be set include the key-lock free mode that unconditionally enables the detachment of the notebook PC 100, the designation of the timer release mode/bus monitor mode upon the key-lock release and the setting of a time-measurement value (timer value) at the timer 410 in the timer release mode.

On the other hand, if the password does not coincide with the prestored password in step S43, the process proceeds to step S45, in which an alarm sound (voice message) is generated, similar to step S8. In step S46, the password-input is awaited again. If the password coincides with the prestored password in step S47, the process proceeds to step S48, in which the output of the alarm sound (voice message) is stopped, and the process proceeds to step S44. In step S47, if the input password is not correct, the process proceeds to step S49, in which a time stamp indicating the erroneous password-input is stored in the HDD similar to step S12 (FIG. 6), and the process ends.

In this manner, also upon the mode setting at the release controller 225, the user who inputs data is checked by a password, which allows a specified user to designate a mode for detaching the notebook PC 100. This protects the notebook PC 100 from being stolen or erroneously detached.

Next, the mechanism of the key lock 229 that key-locks the notebook PC 100 with the dock main body 200 will be described with reference to FIG. 10. Note that in FIG. 10, the elements corresponding to FIGS. 1 to 3 have the same reference numerals and the explanations of these elements will be omitted.

Figure 10:
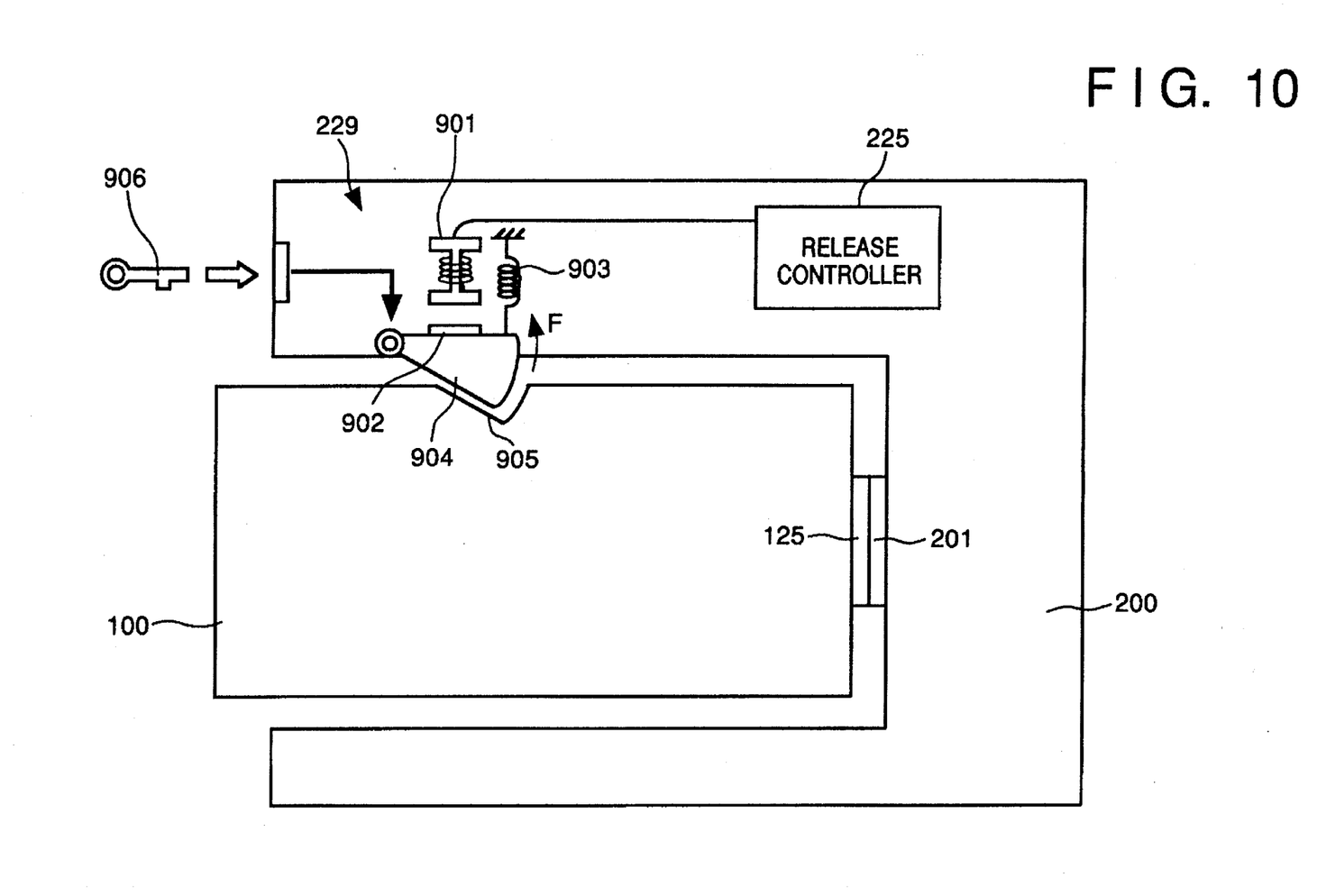
FIG. 10 is a schematic block diagram for explaining a key-lock portion in the embodiment.

In FIG. 10, numeral 901 denotes an electromagnet such as a solenoid, for generating magnetic force by a current signal from the release controller 225 to draw a metal piece 902 on a movable piece 904; 903, a spring biasing the movable piece 904 to the notebook PC 100 side; 905, a notch formed at the notebook PC 100, to be engaged with the movable piece 904 by the biasing force of the spring 903. This engagement prevents the detachment of the notebook PC 100 from the dock main body 200. In this state, if the electromagnet 901 is energized by the release controller 225, the electromagnet 901 generates magnetic force. As the pulling force of the metal piece 902 by the magnetic force is stronger than the biasing force of the spring 903, the movable piece 904 moves in the arrow F direction. This releases the engagement between the movable piece 904 and the notch 905 of the notebook PC 100, and the notebook PC 100 becomes detachable from the dock main body 200.

Note that a key 906 releases the lock, and further, may make the rotation of the movable piece 904 in the arrow F direction physically impossible. Preferably, a signal showing the key-set status of the key 906 is supplied with the CPU 101 via the connectors 201 and 125. In this case, the CPU 101 can display a message, e.g., "NOTEBOOK PC CANNOT BE DETACHED" or "CHANGE SETTING OF KEY", on the CRT display unit 300.

Note that the embodiment employs the notebook PC as the first electronic device and the desktop computer (dock main body) as the second electronic device, however, this does not pose any limitation upon the present invention.

As described above, according to the present invention, the detachment procedure is started regardless of on/off status of the power, thus preventing careless detachment or theft-purposed detachment.

According to the embodiment, when the detachment of the notebook PC from the dock main body is instructed, password-input is awaited, and only if the input password coincides with a prestored password, the detachment operation is started. This prevents the detachment of the notebook PC by an unauthorized (unspecified) person.

Further, according to the embodiment, the detachment of the notebook PC from the dock main body is performed after an application program has been executed and the two devices are separated at an appropriate stage of the software execution. This avoids abnormal operation of the CPU, the destruction of file system, damages of data etc. due to detachment in a state where the devices are connected.

Further, according to the embodiment, theft of the notebook PC can be prevented by generating an alarming sound/voice message to an unspecified user.

Further, according to the embodiment, the detachment of the devices is instructed by simply pulling the attached device or designating an icon displayed on a screen.

Further, according to the embodiment, as various detachment modes can be set, detachment in accordance with the convenience of a specified user can be selected.

Further, according to the embodiment, as the mode for unconditionally detaching the device can be set, a built-in apparatus which allows every user detachment of the devices can be provided.

Further, according to the embodiment, since a password can be inputted in voice, the operation of the apparatus can be improved.

As described above, according to the present invention, when the detachment of a first electronic device from a second electronic device is instructed, necessary separation at the stages of hardware and software is first performed, and the first electronic device is made detachable. This prevents destruction of data file or file system.

Further, according to the present invention, detachment by an unauthorized person can be prevented.

Further, according to the present invention, the detachment can be instructed by simple operation.

Further, according to the present invention, various detachment methods can be designated.

The present invention can be applied to a system constituted by a plurality of devices, or to an apparatus comprising a single device. Furthermore, the invention is applicable also to a case where the object of the invention is attained by supplying a program to a system or apparatus.

The present invention is not limited to the above embodiments and various changes and modifications can be made within the spirit and scope of the present invention. Therefore, to appraise the public of the scope of the present invention, the following claims are made.

What is claimed is:

1. A built-in electronic apparatus which has a first electronic device and a second electronic device different from said first electronic device, said first electronic device being attachable to and detachable from said second electronic device, said apparatus comprising:

instruction means for instructing detachment of said first electronic device from said second electronic device;

password-input instruction means for instructing input of a password, in response to a detachment instruction issued by said instruction means;

judgment means for judging whether or not the password, inputted in response to an instruction by said password-input instruction means, is appropriate;

lock means for physically locking the connection between said first and second electronic devices;

lock releasing means for releasing a lock status where said first and second electronic devices are physically locked by said lock means, if said judgment means judges that the password is appropriate.

2. The built-in electronic apparatus according to claim 1, further comprising password storage means for storing information on the password inputted in response to the instruction by said password-input instruction means, into a storage unit of said second electronic device, if said judgment means judges that the password is not appropriate.

3. The built-in electronic apparatus according to claim 1, further comprising:

termination means for quitting an application program currently running, if said judgment means judges that the password is appropriate; and hardware separation means for separating hardware resource of said second electronic device from said first electronic device at the software stage, before said lock releasing means releases the lock status.

4. The built-in electronic apparatus according to claim 1, wherein said instruction means displays an icon indicative of said first electronic device on a display unit of said second electronic device, and said instruction means instructs the detachment of said first electronic device in accordance with designation of the icon and detachment instruction using the icon designated.

5. The built-in electronic apparatus according to claim 1, wherein said instruction means includes detection means for detecting application of pulling force to said first electronic device.

6. The built-in electronic apparatus according to claim 1, wherein said instruction means has a mechanical switch for instructing the detachment of said first electronic device.

7. The built-in electronic apparatus according to claim 1, wherein said password-input instruction means further comprises discrimination means for instructing the input of a password in voice and discriminating an input voice password.

8. The built-in electronic apparatus according to claim 1, further comprising alarm generation means for generating an alarm, if said judgment means judges that the input password is not appropriate.

9. The built-in electronic apparatus according to claim 1, wherein said lock releasing means includes time measurement means for measuring a predetermined time period, and when time measurement by said time measurement means is completed, said lock releasing means releases the lock status where said first and second electronic devices are connected by said lock means.

10. The built-in electronic apparatus according to claim 1, wherein said lock releasing means includes bus monitor means for monitoring operation of a bus, and if said bus monitoring means detects that the operation of the bus has stopped, said lock releasing means releases the lock status where said first and second electronic devices are connected by said lock means.

11. A device detachment method for a built-in electronic apparatus which has a first electronic device and a second electronic device different from the first electronic device, the first electronic device being attachable to and detachable from the second electronic device, said method comprising:

an instruction step of instructing detachment of the first electronic device from the second electronic device, in a lock status where the first and second electronic devices are physically locked by a locking member;

a judgment step of instructing input of a password, in response to a detachment instruction issued in said instruction step, and judging whether or not the password, inputted in response to the detachment instruction in said password-input instruction step, is appropriate; and a releasing step of releasing the lock status, if it is judged in said judgment step that the password is appropriate.

12. The device detachment method according to claim 11, further comprising a password storage step of storing information on the password inputted in response to the detachment instruction in said password-input instruction step, into a storage unit of the second electronic device, it is judged in said judgment step that the password is not appropriate.

13. The device detachment method according to claim 11, further comprising the steps of:

terminating an application program currently running, if it is judged that the password is appropriate in said judgment step; and separating hardware resource of said second electronic device from the first electronic device at the software stage, before the lock status is released in said releasing step.

14. The device detachment method according to claim 11, wherein, in the instruction step, the detachment of said first electronic device is instructed by detection of application of pulling force to the first electronic device in a device detaching direction.

15. The device detachment method according to claim 11, wherein, in the instruction step, the detachment of said first electronic device is instructed by designation of an icon displayed on a display unit of the second electronic device and detachment instruction using the icon designated.

16. The device detachment method according to claim 11, wherein, in said releasing step, after an application currently running is terminated and hardware resource of the second electronic device is separated from the first electronic device at the software stage, then the lock status is released.

17. The device detachment method according to claim 11, wherein, in said releasing step, after an application currently running is terminated and hardware resource of the second electronic device is separated from the first electronic device at the software stage, further, after a predetermined period, the lock status is released.

18. The device detachment method according to claim 11, wherein, in said releasing step, after an application currently running is terminated and hardware resource of the second electronic device is separated from the first electronic device at the software stage, if operation of a CPU bus is stopped, the lock status is released.

* * * * *

UNITED STATES PATENT AND TRADEMARK OFFICE
CERTIFICATE OF CORRECTION

PATENT NO. : 5,648,762

DATED : July 15, 1997

INVENTOR(S): AKIRA ICHIMURA ET AL.

It is certified that error appears in the above-identified patent and that said Letters Patent is hereby corrected as shown below:

COLUMN 1
Line 45, "unautorized" should read --unauthorized--.

COLUMN 2
Line 35, "note" should read --notebook--;
Line 65, "different" should read --differ--.

COLUMN 3
Line 19, "electronic" should read --electricity--.

COLUMN 4
Line 29, "megabyte" should read --megabytes--;
Line 55, "large-scaled" should read --large-scale--.

COLUMN 6
Line 11, "comprise," should read --comprise--;
Line 66, "the like" should be deleted.

COLUMN 9
Line 20, "HDD" should read --HDD214,--.

COLUMN 10
Line 12, "alarming" should read --alarm--;
Line 47, "appraise" should read --apprise--.

UNITED STATES PATENT AND TRADEMARK OFFICE
CERTIFICATE OF CORRECTION

PATENT NO. : 5,648,762

DATED : July 15, 1997

INVENTOR(S): AKIRA ICHIMURA ET AL.

It is certified that error appears in the above-identified patent and that said Letters Patent is hereby corrected as shown below:

<u>COLUMN 12</u>
```
Line 18, "it" should read --if it--;
Line 30, "the" (first occurrence) should read --said--
  and "said" should read --the--;
Line 35, "the" (first occurrence) should read --said--
  and "said" should read --the--.
```

Signed and Sealed this

Fourteenth Day of April, 1998

Attest:

BRUCE LEHMAN

*Attesting Officer*     *Commissioner of Patents and Trademarks*